(12) United States Patent
Gracon et al.

(10) Patent No.: US 7,697,430 B2
(45) Date of Patent: Apr. 13, 2010

(54) APPARATUS AND METHODS FOR SCHEDULING PACKETS IN A BROADBAND DATA STREAM

(75) Inventors: Glenn Gracon, Palo Alto, CA (US);
Murray Bowles, Santa Clara, CA (US);
Kenneth C. Hsu, San Jose, CA (US);
David Curry, San Jose, CA (US)

(73) Assignee: Tellabs San Jose, Inc., San Jose, CA (US)

( * ) Notice: Subject to any disclaimer, the term of this patent is extended or adjusted under 35 U.S.C. 154(b) by 848 days.

(21) Appl. No.: 11/215,606

(22) Filed: Aug. 29, 2005

(65) Prior Publication Data

US 2009/0086628 A1    Apr. 2, 2009

Related U.S. Application Data

(63) Continuation of application No. 09/737,917, filed on Dec. 15, 2000, now Pat. No. 6,987,732.

(51) Int. Cl.
*H04L 12/26* (2006.01)
(52) U.S. Cl. .................................. 370/232; 370/235
(58) Field of Classification Search ............. 370/237, 370/231, 235.1, 229, 230.1, 232, 235, 252, 370/395.4
See application file for complete search history.

(56) References Cited

U.S. PATENT DOCUMENTS

| | | | | |
|---|---|---|---|---|
| 5,610,745 A | * | 3/1997 | Bennett | .................... 398/52 |
| 5,633,861 A | * | 5/1997 | Hanson et al. | ............. 370/232 |
| 5,638,359 A | * | 6/1997 | Peltola et al. | ............... 370/229 |
| 5,719,853 A | | 2/1998 | Ikeda | |
| 5,787,271 A | * | 7/1998 | Box et al. | ....................... 714/4 |
| 5,790,522 A | | 8/1998 | Fichou et al. | |
| 5,926,459 A | | 7/1999 | Lyles et al. | |
| 5,959,993 A | * | 9/1999 | Varma et al. | ................ 370/397 |
| 6,067,301 A | | 5/2000 | Aattresh | |
| 6,084,855 A | | 7/2000 | Soirinsuo et al. | |
| 6,104,700 A | | 8/2000 | Haddock et al. | |
| 6,111,673 A | | 8/2000 | Cheng et al. | |
| 6,389,019 B1 | | 5/2002 | Fan et al. | |
| 6,400,688 B1 | * | 6/2002 | Lau et al. | .................. 370/236.1 |

(Continued)

OTHER PUBLICATIONS

Final Office Action dated Feb. 5, 2009 from U.S. Appl. No. 11/399,301, filed Apr. 6, 2006.

(Continued)

*Primary Examiner*—Kwang B Yao
*Assistant Examiner*—Andrew Lai
(74) *Attorney, Agent, or Firm*—Hamilton, Brook, Smith & Reynolds, P.C.

(57) ABSTRACT

A packet scheduler includes a packet manager interface, a policer, a congestion manager, a scheduler, and a virtual output queue (VOQ) handler. The policer assigns a priority to each packet. Depending on congestion levels, the congestion manager determines whether to send a packet based on the packet's priority assigned by the policer. The scheduler schedules packets in accordance with configured rates for virtual connections and group shapers. A scheduled packet is queued at a virtual output queue (VOQ) by the VOQ handler. In one embodiment, the VOQ handler sends signals to a packet manager (through the packet manager interface) to instruct the packet manager to transmit packets in a scheduled order.

20 Claims, 10 Drawing Sheets

U.S. PATENT DOCUMENTS

| | | | |
|---|---|---|---|
| 6,424,624 B1* | 7/2002 | Galand et al. | 370/231 |
| 6,438,138 B1 | 8/2002 | Kamiya | |
| 6,611,522 B1 | 8/2003 | Zheng et al. | |
| 6,636,515 B1 | 10/2003 | Roy et al. | |
| 6,687,228 B1 | 2/2004 | Fichou et al. | |
| 6,741,562 B1 | 5/2004 | Keirouz et al. | |
| 6,748,435 B1* | 6/2004 | Wang et al. | 709/225 |
| 6,757,249 B1 | 6/2004 | Kejriwal et al. | |
| 6,847,641 B2 | 1/2005 | Kazban et al. | |
| 6,859,435 B1* | 2/2005 | Lee et al. | 370/231 |
| 6,987,732 B2 | 1/2006 | Gracon et al. | |
| 7,065,050 B1 | 6/2006 | Herbst | |
| 2002/0054568 A1* | 5/2002 | Hoogenboom et al. | 370/235.1 |
| 2003/0037159 A1 | 2/2003 | Zhao et al. | |
| 2003/0086413 A1 | 5/2003 | Tartarelli et al. | |
| 2004/0005896 A1 | 1/2004 | Davis et al. | |
| 2004/0120332 A1 | 6/2004 | Hendel | |
| 2007/0237074 A1 | 10/2007 | Curry | |
| 2008/0205277 A1 | 8/2008 | Ibezim et al. | |

OTHER PUBLICATIONS

Office Action dated Sep. 12, 2008 from U.S. Appl. No. 11/399,301, filed Apr. 6, 2006.

Office Action dated Sep. 17, 2009 from U.S. Appl. No. 11/399,301, filed Apr. 6, 2006.

* cited by examiner

APPARATUS AND METHODS FOR SCHEDULING PACKETS IN A BROADBAND DATA STREAM

RELATED APPLICATIONS

This application is a continuation application of U.S. application Ser. No. 09/737,917 filed on Dec. 15, 2000, which relates to an application entitled "Apparatus and Methods for Managing Packets in a Broadband Data Stream" filed on Dec. 15, 2000 bearing Ser. No. 09/737,916, an application entitled "Apparatus and Methods for Processing Packets in a Broadband Data Stream" filed on Sep. 13, 2000 bearing Ser. No. 09/661,244, and an application entitled "Apparatus and Methods for Establishing Virtual Private Networks in a Broadband Network" filed on Mar. 8, 2001 bearing Ser. No. 09/803,090. These related applications are hereby incorporated by reference herein for all purposes.

FIELD OF THE INVENTION

This invention relates to apparatus and methods for scheduling packets in a data stream. In particular, this invention relates to apparatus and methods for scheduling packets in a broadband data stream.

BACKGROUND OF THE INVENTION

As the Internet evolves into a worldwide commercial data network for electronic commerce and managed public data services, increasingly, customer demands have focused on the need for advanced Internet Protocol (IP) services to enhance content hosting, broadcast video and application outsourcing. To remain competitive, network operators and Internet service providers (ISPs) must resolve two main issues: meeting continually increasing backbone traffic demands and providing a suitable Quality of Service (QoS) for that traffic. Currently, many ISPs have implemented various virtual path techniques to meet the new challenges. Generally, the existing virtual path techniques require a collection of physical overlay networks and equipment. The most common existing virtual path techniques are: optical transport, asynchronous transfer mode (ATM)/frame relay (FR) switched layer, and narrowband internet protocol virtual private networks (IP VPN).

The optical transport technique is the most widely used virtual path technique. Under this technique, an ISP uses point-to-point broadband bit pipes to custom design a point-to-point circuit or network per customer. Thus, this technique requires the ISP to create a new circuit or network whenever a new customer is added. Once a circuit or network for a customer is created, the available bandwidth for that circuit or network remains static.

The ATM/FR switched layer technique provides QoS and traffic engineering via point-to-point virtual circuits. Thus, this technique does not require creations of dedicated physical circuits or networks compared to the optical transport technique. Although this technique is an improvement over the optical transport technique, this technique has several drawbacks. One major drawback of the ATM/FR technique is that this type of network is not scalable. In addition, the ATM/FR technique also requires that a virtual circuit be established every time a request to send data is received from a customer.

The narrowband IP VPN technique uses best effort delivery and encrypted tunnels to provide secured paths to the customers. One major drawback of a best effort delivery is the lack of guarantees that a packet will be delivered at all. Thus, this is not a good candidate when transmitting critical data.

Thus, it is desirable to provide apparatus and methods that reduce operating costs for service providers by collapsing multiple overlay networks into a multi-service IP backbone. In particular, it is desirable to provide apparatus and methods that allow an ISP to build the network once and sell such network multiple times to multiple customers.

In addition, data packets coming across a network may be encapsulated in different protocol headers or have nested or stacked protocols. Examples of existing protocols are: IP, ATM, FR, multi-protocol label switching (MPLS), and Ethernet. Thus, it is further desirable to provide apparatus that are programmable to accommodate existing protocols and to anticipate any future protocols. It is further desirable to provide apparatus and methods that efficiently schedules packets in a broadband data stream.

SUMMARY OF THE INVENTION

This invention provides apparatus and methods that uses multiprotocol label switching technology to provides policing, congestion management, shaping and scheduling of packets according to predefined rates for virtual connections and group shapers.

In an exemplary method, a packet scheduler accepts packet identifiers from a packet manager, processes the received packet identifiers, and informs the packet manager to output packets at designated time slots or drop certain packets if congestion occurs.

DETAILED DESCRIPTION OF THE INVENTION

Figure 1:
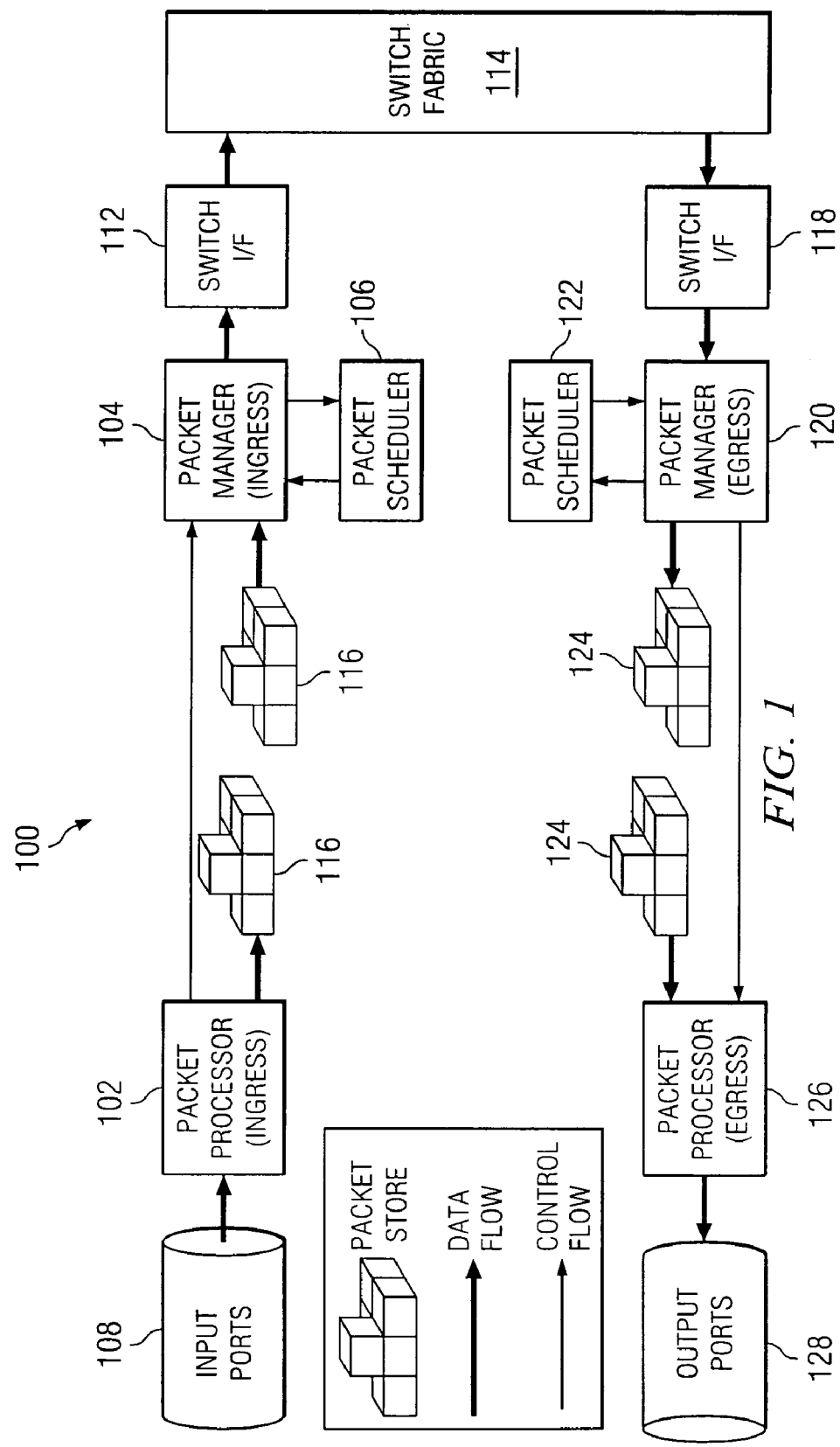
FIG. 1 schematically illustrates an exemplary traffic management system in accordance with an embodiment of the invention.

FIG. 1 schematically illustrates a traffic management system 100 for managing packet traffic in a network. In the ingress direction, the traffic management system 100 comprises a packet processor 102, a packet manager 104, a packet scheduler 106, a switch interface 112, and a switch fabric 114. The packet processor 102 receives packets from physical input ports 108 in the ingress direction.

In the ingress direction, the packet processor 102 receives incoming packets from the input ports 108 and, after some processing, stores the packets in a buffer 116 managed by the packet manager 104. After a packet is stored in the buffer 116, a copy of a packet descriptor, which includes a packet identifier and other packet information, is sent from the packet manager 104 to the packet scheduler 106 to be processed for traffic control. The packet scheduler 106 performs policing and congestion management processes on any received packet identifier. The packet scheduler 106 sends instructions to the packet manager 104 to either drop a packet, due to policing or congestion, or send a packet according to a schedule. Typically, the packet scheduler 106 determines such a schedule for each packet. If a packet is to be sent, the packet identifier of that packet is shaped and queued by the packet scheduler 106. The packet scheduler 106 then sends the modified packet identifier to the packet manager 104. Upon receipt of a modified packet identifier, the packet manager 104 transmits the packet identified by the packet identifier to the switch interface 112 during the designated time slot to be sent out via the switch fabric 114.

In the egress direction, packets arrive through the switch fabric 114 and switch interface 118, and go through similar processes in a packet manager 120, a packet scheduler 122, a buffer 124, and a packet processor 126. Finally, egress packets exit the system through output ports 128. Operational differences between ingress and egress are configurable.

The packet processor 102 and the packet manager 104 are described in more detail in related applications as referenced above.

Figure 2:
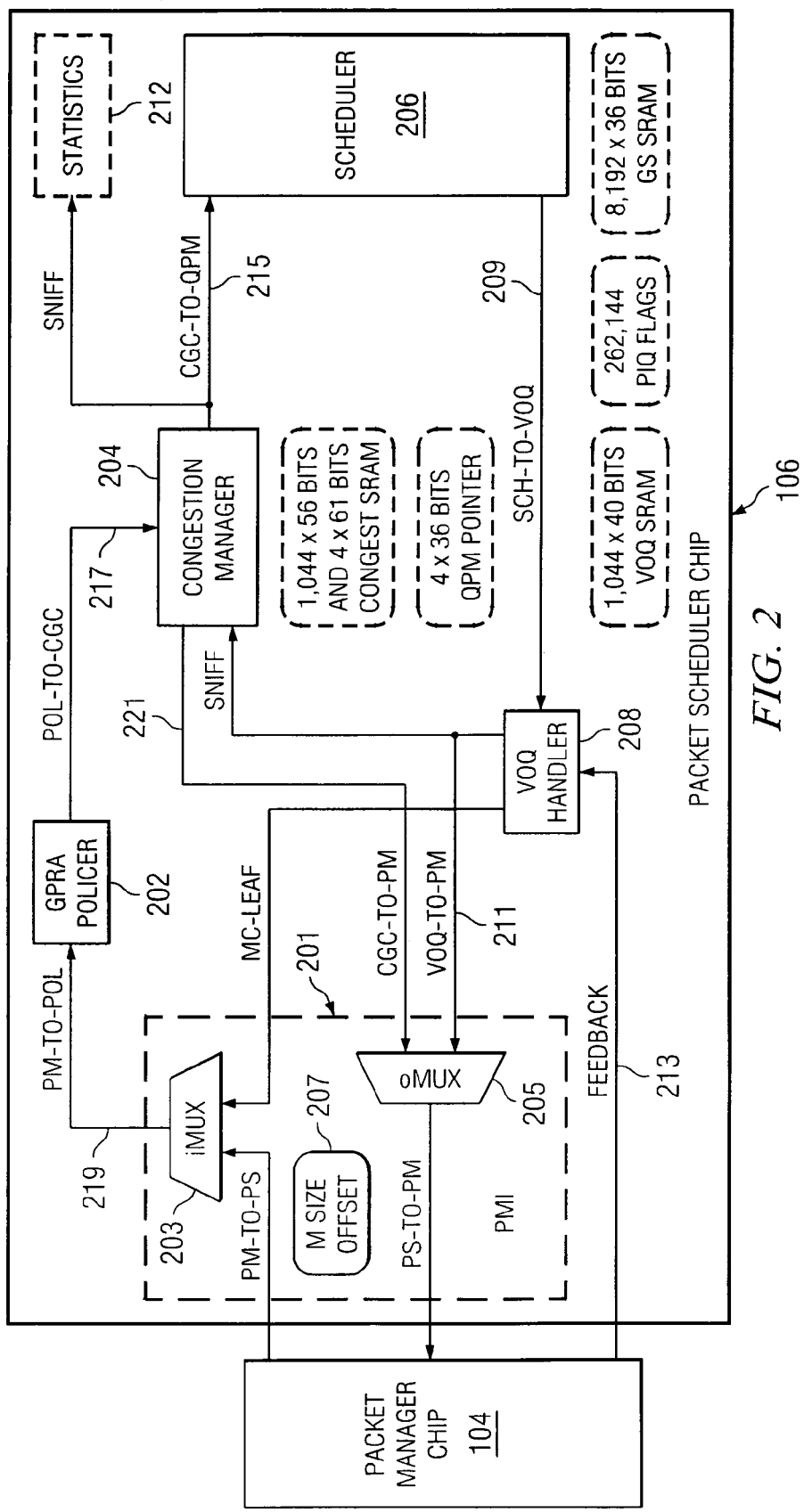
FIG. 2 schematically illustrates an exemplary packet scheduler in accordance with an embodiment of the invention.

FIG. 2 illustrates an exemplary packet scheduler 106. The packet scheduler 106 includes a packet manager interface 201, a policer 202, a congestion manager 204, a scheduler 206, and a virtual output queue (VOQ) handler 208. The packet manager interface 201 includes an input multiplexer 203, an output multiplexer 205, and a global packet size offset register 207. In an exemplary embodiment, when the packet manager 104 receives a data packet, it sends a packet descriptor to the packet manager interface 201. In an exemplary embodiment, the packet descriptor includes a packet identifier (PID), an input connection identifier (ICID), packet size information, and a header. The packet manager interface 201 subtracts the header from the packet descriptor before sending the remaining packet descriptor to the policer 202 via a signal line 219. The actual packet size of the packet is stored in the global packet size offset register 207. In general, the packet descriptor is processed by the policer 202, the congestion manager 204, the scheduler 206, and the virtual output queue handler 208, in turn, then outputted to the packet manager 104 through the packet manager interface 201. In an exemplary embodiment, the header, which was subtracted earlier before the packet descriptor was sent to the policer 202, is added back to the packet descriptor in the packet manager interface 201 before the packet descriptor is outputted to the packet manager 104.

The policer 202 performs a policing process on received packet descriptors. In an exemplary embodiment, the policing process is configured to handle variably-sized packets. In one embodiment, the policer 202 supports a set of virtual connections identified by the ICIDs included in the packet descriptors. Typically, the policer 202 stores configuration parameters for those virtual connections in an internal memory indexed by the ICIDs. Output signals from the policer 202 include a color code for each packet descriptor. In an exemplary embodiment, the color code identifies a packet's compliance to its assigned priority. The packet descriptors and their respective color codes are sent by the policer 202 to the congestion manager 204 via a signal line 217. An exemplary policing process performed by the policer 202 is provided in FIG. 3, which is discussed below.

Depending on congestion levels, the congestion manager 204 determines whether to send the packet descriptor received from the policer 202 to the scheduler 206 for further processing or to drop the packets associated with the packet descriptors. For example, if the congestion manager 204 decides that a packet should not be dropped, the congestion manager 204 sends a packet descriptor associated with that packet to the scheduler 206 to be, scheduled via a signal line 215. If the congestion manager 204 decides that a packet should be dropped, the congestion manager 204 informs the packet manager 104, through the packet manager interface 201 via a signal line 221, to drop that packet.

In an exemplary embodiment, the congestion manager 204 uses a congestion table to store congestion parameters for each virtual connection. In one embodiment, the congestion manager 204 also uses an internal memory to store per-port and per-priority parameters for each virtual connection. Exemplary processes performed by the congestion manager 204 are provided in FIGS. 4 and 6 below.

In an exemplary embodiment, an optional statistics block 212 in the packet scheduler 106 provides four counters per virtual connection for statistical and debugging purposes. In an exemplary embodiment, the four counters provide eight counter choices per virtual connection. In one embodiment, the statistics block 212 receives signals directly from the congestion manager 204.

The scheduler 206 schedules PIDs in accordance with configured rates for connections and group shapers. In an exemplary embodiment, the scheduler 206 links PIDs received from the congestion manager 204 to a set of input queues that are indexed by ICIDs. The scheduler 206 sends PIDs stored in the set of input queues to VOQ handler 208 via a signal line 209, beginning from the ones stored in a highest priority ICID. In an exemplary embodiment, the scheduler 206 uses internal memory to store configuration parameters per connection and parameters per group shaper. The size of the internal memory is configurable depending on the number of group shapers it supports.

In an exemplary embodiment, a scheduled PID, which is identified by a signal from the scheduler 206 to the VOQ handler 208, is queued at a virtual output queue (VOQ). The VOQ handler 208 uses a feedback signal from the packet manager 104 to select a VOQ for each scheduled packet. In one embodiment, the VOQ handler 208 sends signals to the packet manager 104 (through the packet manager interface 201 via a signal line 211) to instruct the packet manager 104 to transmit packets in a scheduled order. In an exemplary embodiment, the VOQs are allocated in an internal memory of the VOQ handler 208.

In an exemplary embodiment, if a packet to be transmitted is a multicast source packet, leaf PIDs are generated under the control of the VOQ handler 208 for the multicast source packet. The leaf PIDs are handled the same way as regular (unicast) PIDs in the policer 202, congestion manager 204, and the scheduler 206.

The Policer

There are two prior art generic cell rate algorithms, namely, the virtual schedule algorithm (VSA) and the continuous-state leaky bucket algorithm. These two algorithms essentially produce the same conforming or non-conforming result based on a sequence of packet arrival time. The policer 202 in accordance with an exemplary embodiment of this invention uses a modified VSA to perform policing compliance test. The VSA is modified to handle variable-size packets.

In an exemplary embodiment in accordance with the invention, the policer 202 performs policing processes on packets for multiple virtual connections. In an exemplary embodiment, each virtual connection is configured to utilize either one or two leaky buckets. If two leaky buckets are used, the first leaky bucket is configured to process at a user specified maximum information rate (MIR) and the second leaky bucket is configured to process at a committed information rate (CIR). If only one leaky bucket is used, the leaky bucket is configured to process at a user specified MIR. In an exemplary embodiment, each leaky bucket processes packets independently and a lower compliance result from each leaky bucket is the final result for that leaky bucket.

The first leaky bucket checks packets for compliance/conformance with the MIR and a packet delay variation tolerance (PDVT). Non-conforming packets are dropped (e.g., by setting a police bit to one) or colored red, depending upon the policing configuration. Packets that are conforming to MIR are colored green. A theoretical arrival time (TAT) calculated for the first leaky bucket is updated if a packet is conforming. The TAT is not updated if a packet is non-conforming.

The second leaky bucket, when implemented, operates substantially the same as the first leaky bucket except packets are checked for compliance/conformance to the CIR and any non-conforming packet is either dropped or colored yellow instead of red. Packets conforming to the CIR are colored green. The TAT for the second leaky bucket is updated if a packet is conforming. The TAT is not updated if a packet is non-conforming.

In an exemplary embodiment, during initial set up of a virtual circuit, a user selected policing rate is converted into a basic time interval (Tb=1/rate), based on a packet size of one byte. A floating-point format is used in the conversion so that the Tb can cover a wide range of rates (e.g., from 64 kb/s to 10 Gb/s) with acceptable granularity. The Tb, in binary representation, is stored in a policing table indexed by the ICIDs. When a packet size of N bytes is received, the policer 202 reads the Tb and a calculated TAT. In an exemplary embodiment, a TAT is calculated based on user specified policing rate for each leaky bucket. A calculated TAT is compared to a packet arrival time (Ta) to determine whether the packet conforms to the policing rate of a leaky bucket. In an exemplary embodiment, Tb and a packet size (N) are used to update the TAT if a packet is conforming. In one embodiment, for each packet that conforms to a policing rate, the TAT is updated to equal to TAT+Tb*N. Thus, the TAT may be different for each packet depending on the packet size, N.

Typically, a final result color at the end of the policing process is the final packet color. But if a "check input color" option is used, the final packet color is the lower compliance color between an input color and the final result color, where green indicates the highest compliance, yellow indicates a lower compliance than green, and red indicates the lowest compliance. In an exemplary embodiment, the policer 202 sends the final packet color and the input color to the congestion manager 204. Table 1 below lists exemplary outcomes of an embodiment of the policing process:

TABLE 1

| Input Color | MIR Bucket Outcome | TAT | CIR Bucket Outcome | TAT' | FINAL COLOR Check | No Check |
|---|---|---|---|---|---|---|
| Green | Conform | Update | Conform | Update | Green | Green |
| Green | Conform | Update | Non-Conform | No-update | Yellow | Yellow |
| Green | Non-Conform | No-update | Don't Care | No-update | Red | Red |
| Yellow | Conform | Update | Conform | Update | Yellow | Green |
| Yellow | Conform | Update | Non-Conform | No-update | Yellow | Yellow |
| Yellow | Non-Conform | No-update | Don't Care | No-update | Red | Red |
| Red | Conform | Update | Non-Conform | No-update | Red | Green |
| Red | Conform | Update | Conform | Update | Red | Yellow |
| Red | Non-Conform | No-update | Don't Care | No-update | Red | Red |

Figure 3:
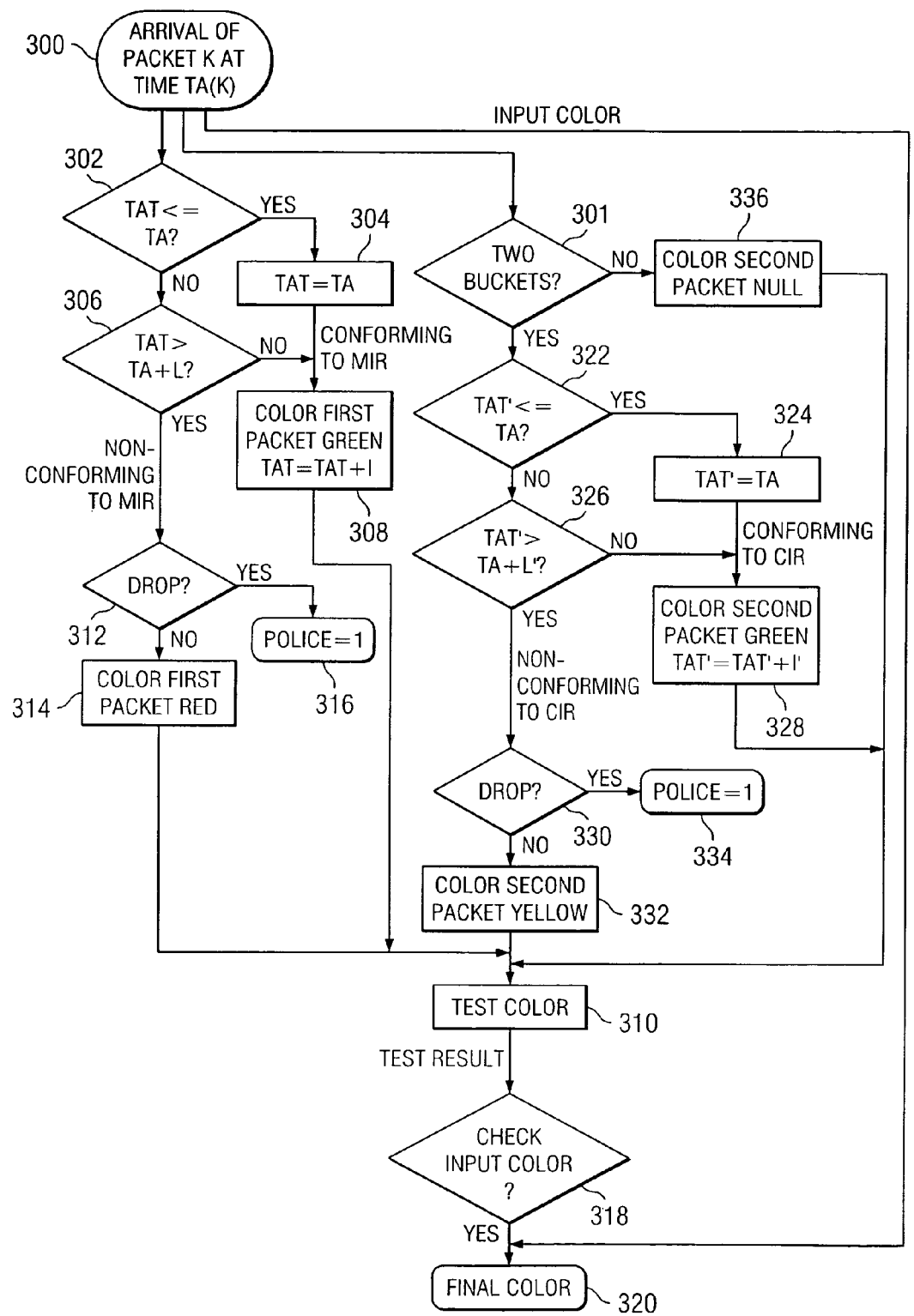
FIG. 3 illustrates an exemplary policing process in accordance with an embodiment of the invention.

FIG. 3 illustrates an exemplary policing process performed by the policer 202 in accordance with an embodiment of the invention. In FIG. 3, two leaky buckets are used. First, a process performed in the first leaky bucket is described. At step 300 a packet "k" having an input color arrives at time Ta(k). Next, the theoretical arrival time (TAT) of the first leaky bucket is compared to the arrival time (Ta) (step 302). In an exemplary embodiment, the TAT is calculated based on the MIR. If the TAT is less than or equal to Ta, the TAT is set to equal to Ta (step 304). If the TAT is greater than Ta, TAT is compared to the sum of Ta and the packet's limit, L (step 306). The limit, L, is the packet's PDVT specified during a virtual circuit set up. If the TAT is greater than the sum of Ta and L, thus non-conforming to the MIR, whether the packet should be dropped is determined at step 312. If the packet is determined to be dropped, a police bit is set to equal to 1 (step 316). If the packet is determined to not be dropped, the packet is colored red at step 314.

Referring back to step 306, if the TAT is less than the sum of Ta and L, thus conforming to the MIR, the packet is colored green and the TAT is set to equal TAT+I (step 308). The increment, I, is a packet inter-arrival time that varies from packet to packet. In an exemplary embodiment, I is equal to the basic time interval (Tb) multiplied by the packet size (N). The basic time interval, Tb, is the duration of a time slot for receiving a packet.

Subsequent to either steps 308 or 314, the packet color is tested at step 310. In an exemplary embodiment, if a "check input color" option is activated, the final result color from step 310 is compared to the input color (step 318). In an exemplary embodiment, the lower compliance color between the final result and the input color is the final color (step 320). If a "check input color" option is not activated, the final color is the final result color obtained at step 310 (step 320).

If a second leaky bucket is used, a copy of the same packet having a second input color is processed substantially simultaneously in the second leaky bucket (steps 322-334). If a second leaky bucket is not used, as determined at step 301, the copy is colored "null" (step 336). The color "null" indicates a higher compliance than the green color. The null color becomes the final result color for the copy and steps 318 and 320 are repeated to determine a final color for the copy.

Referring back to step 301, if a second leaky bucket is used, the TAT' of a second leaky bucket is compared to the arrival time of the copy, Ta (step 322). In an exemplary embodiment, the TAT' is calculated based on the CIR. If the TAT' is less than or equal to Ta, the TAT' is set to equal Ta (step 324). If the TAT' is greater than Ta, the TAT' is compared to the sum of Ta and L' (step 326). In an exemplary embodiment, the limit, L', is the burst tolerance (BT). Burst tolerance is calculated based on the MIR, CIR, and a maximum burst size (MBS) specified during a virtual connection set up. If the TAT' is greater than the sum of the Ta and L', thus non-conforming to the CIR, whether the copy should be dropped is determined at step 330. If the copy is determined to be dropped, a police bit is set to equal to 1 (step 334). Otherwise, the copy is colored yellow at step 332.

Referring back to step 326, if the TAT' is less than or equal to the sum of the Ta and L', thus conforming to the CIR, the copy is colored green and the TAT' is set to equal TAT'+I' (step 328). In an exemplary embodiment, the increment, I', is equal to basic time interval of the copy (Tb') multiplied by the packet size (N). Subsequent to either steps 328 or 332, the assigned color is tested at step 310. Next, if a "check input color" option is activated, the final result color is compared to the input color of the copy (step 318). The lower compliance color between the final result color and the input color is the final color (step 320). If a "check input color" option is not activated, the final color (step 320) is the final result color at step 310.

The Congestion Manager

A prior art random early detection process (RED) is a type of congestion management process. The RED process typically includes two parts: (1) an average queue size estimation; and (2) a packet drop decision. The RED process calculates the average queue size (Q_avg) using a low-pass filter and an exponential weighting constant (Wq). In addition, each calculation of the Q_avg is based on a previous queue average and the current queue size (Q_size). A new Q_avg is calculated when a packet arrives if the queue is not empty. The RED process determines whether to drop a packet using two parameters: a minimum threshold (MinTh) and a maximum threshold (MaxTh). When the Q_avg is below the MinTh, a packet is kept. When the Q_avg exceeds the MaxTh, a packet is dropped. If the Q_avg is somewhere between MinTh and MaxTh, a packet drop probability (Pb) is calculated. The Pb is a function of a maximum probability (Pm), the difference between the Q_avg and the MinTh, and the difference between the MaxTh and the MinTh. The Pm represents the upper bound of a Pb. A packet is randomly dropped based on the calculated Pb. For example, a packet is dropped if the total number of packets received is greater than or equal to a random variable (R) divided by Pb. Thus, some high priority packet may be inadvertently dropped.

In an exemplary embodiment in accordance with the invention, the congestion manager 204 applies a modified RED process (MRED). The congestion manager 204 receives packet information (i.e., packet descriptor, packet size, and packet color) from the policer 202 and performs congestion tests on a set of virtual queue parameters, i.e., per-connection, per-group, and per-port/priority. If a packet passes all of the set of congestion tests, then the packet information for that packet passes to the scheduler 206. If a packet fails one of the congestion tests, the congestion manager 204 sends signals to the packet manager 104 to drop that packet. The MRED process uses an instantaneous queue size (NQ_size) to determine whether to drop a received packet.

In an exemplary embodiment, five congestion regions are separated by four programmable levels: Pass_level, Red_level, Yel_level, and Grn_level. Each level represents a predetermined queue size. For example, all packets received when the NQ_size is less than the Pass_level are passed. Packets received when the NQ size falls between the red, yellow, and green levels have a calculable probability of being dropped. For example, when the NQ_size is equal to 25% Red_level, 25% of packets colored red will be dropped while all packets colored yellow or green are passed. When the NQ_size exceeds the Grn_level, all packets are dropped. This way, lower compliance packets are dropped before any higher compliance packet is dropped.

Figure 4:
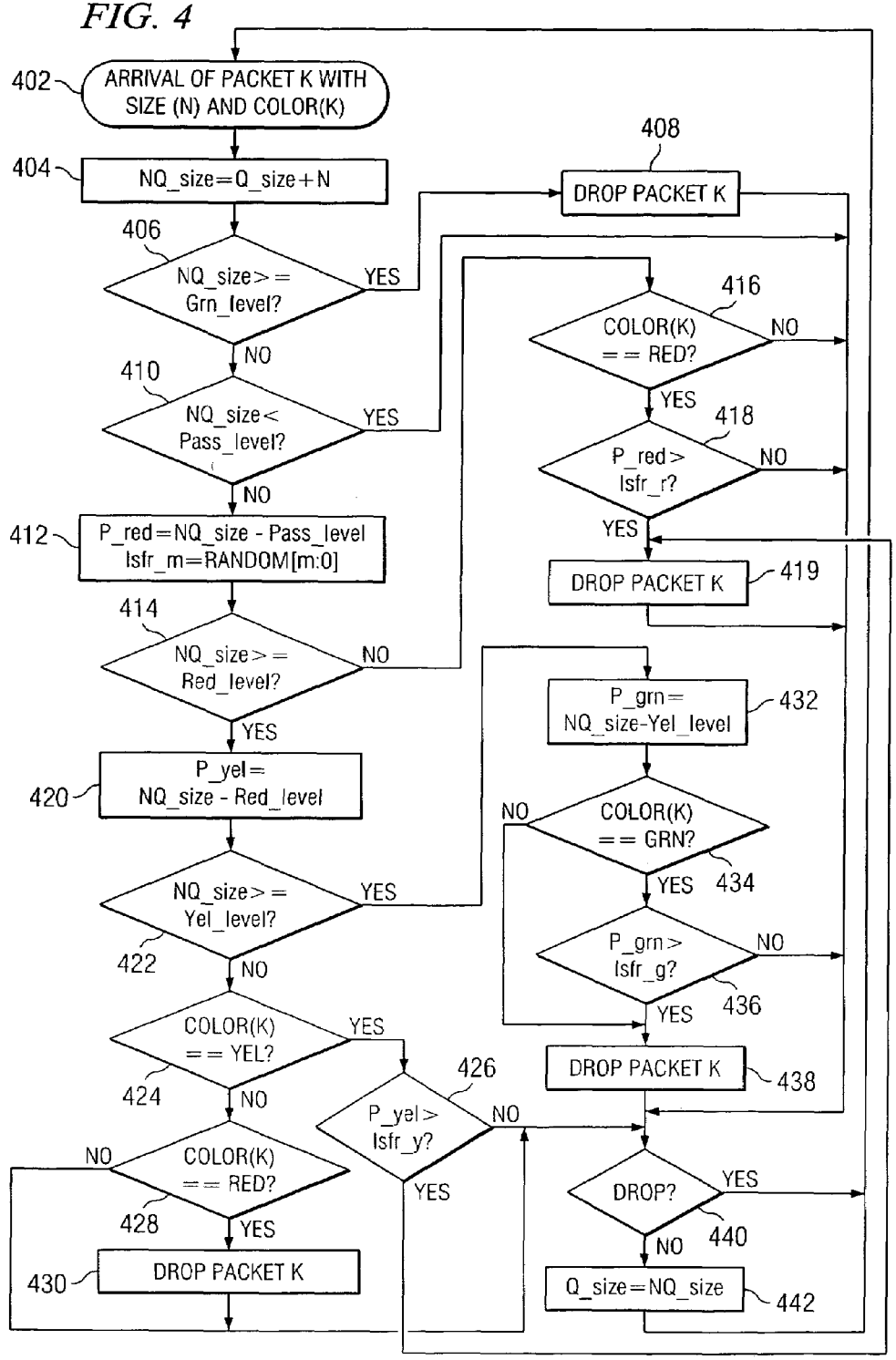
FIG. 4 illustrates an exemplary congestion management process in accordance with an embodiment of the invention.

FIG. 4 illustrates an exemplary MRED process in accordance with an embodiment of the invention. In FIG. 4, the MRED process is weighted with three different drop preferences: red, yellow, and green. The use of three drop preferences is based on the policing output of three colors. One skilled in the art would recognize that to implement more drop preferences requires more colors from the policing output. At step 402, a packet, k, having a size "N" and a color(k) is received by the congestion manager 204. In an exemplary embodiment, the NQ_size is calculated based on the current queue size (Q_size) and the packet size (N) (step 404). The NQ_size is compared to the Grn_level (step 406). If the NQ_size is greater than or equal to the Grn_level, the packet is dropped (step 408). If the NQ_size is less than the Grn_level, the NQ_size is compared to the Pass_level (step 410). If the NQ_size is less than the Pass_level, the packet is passed (step 440). If the NQ_size is greater than the Pass_level, a probability of dropping a red packet (P_red) is determined and random numbers for each packet color are generated by a linear shift feedback register (LSFR) (step 412). Next, the NQ_size is compared to the Red_level (step 414). If the NQ_size is less than the Red_level, whether the packet color is red is determined (step 416). If the packet color is not red, the packet is passed (step 440). If the packet color is red, the P_red is compared to the random number (lsfr_r) generated by the LSFR for red packets (step 418). If the P_red is less than or equal to lsfr_r, the packet is passed (step 440). Otherwise, the packet is dropped (step 419).

Referring back to step 414, if the NQ_size is greater than or equal to the Red_level, the probability to drop a yellow packet (P_yel) is determined (step 420). Next, the NQ_size is compared to the Yel_level (step 422). If the NQ_size is less than the Yel_level, whether the packet color is yellow is determined (step 424). If the packet is yellow, the P_yel is compared to the random number (lsfr_y) generated by the LSFR for yellow packets (step 426). If the P_yel is less than or equal to lsfr_y, the packet is passed (step 440). Otherwise, the packet is dropped (step 419). Referring back to step 424, if the packet is not yellow, whether the packet is red is determined (step 428). If the packet is red, the packet is dropped (step 430). If the packet is not red, by default it is green, and the packet is passed (step 440).

Referring back to step 422, if the NQ_size is greater than or equal to Yel_level, the probability to drop a green packet (P_grn) is determined (step 432). Next, whether the packet is colored green is determined (step 434). If the packet is green, the P_grn is compared to the random number (lsfr_g) generated by the LSFR for green packets (step 436). If the P_grn is less than or equal to the lsfr_g, the packet is passed (step 440). Otherwise, the packet is dropped (step 438). At step 440, if the packet is passed, the Q_size is set to equal to NQ_size (step 442) and the process repeats for a new packet at step 402. If the packet is dropped, the process repeats for a new packet at step 402.

In an exemplary embodiment, the MRED process uses linear feedback shift registers (LFSRs) of different lengths and feedback taps to generate non-correlated random numbers. A LFSR is a sequential shift register with combinational feedback points that cause the binary value of the register to cycle through randomly. The components and functions of a LFSR are well known in the art. The LFSR is frequently used in such applications as error code detection, bit scrambling, and data compression. Because the LFSR loops through repetitive sequences of pseudo-random values, the LFSR is a good candidate for generating pseudo-random numbers. A person skilled in the art would recognize that other combinational logic devices can also be used to generate pseudo-random numbers for purposes of the invention.

Figure 5:
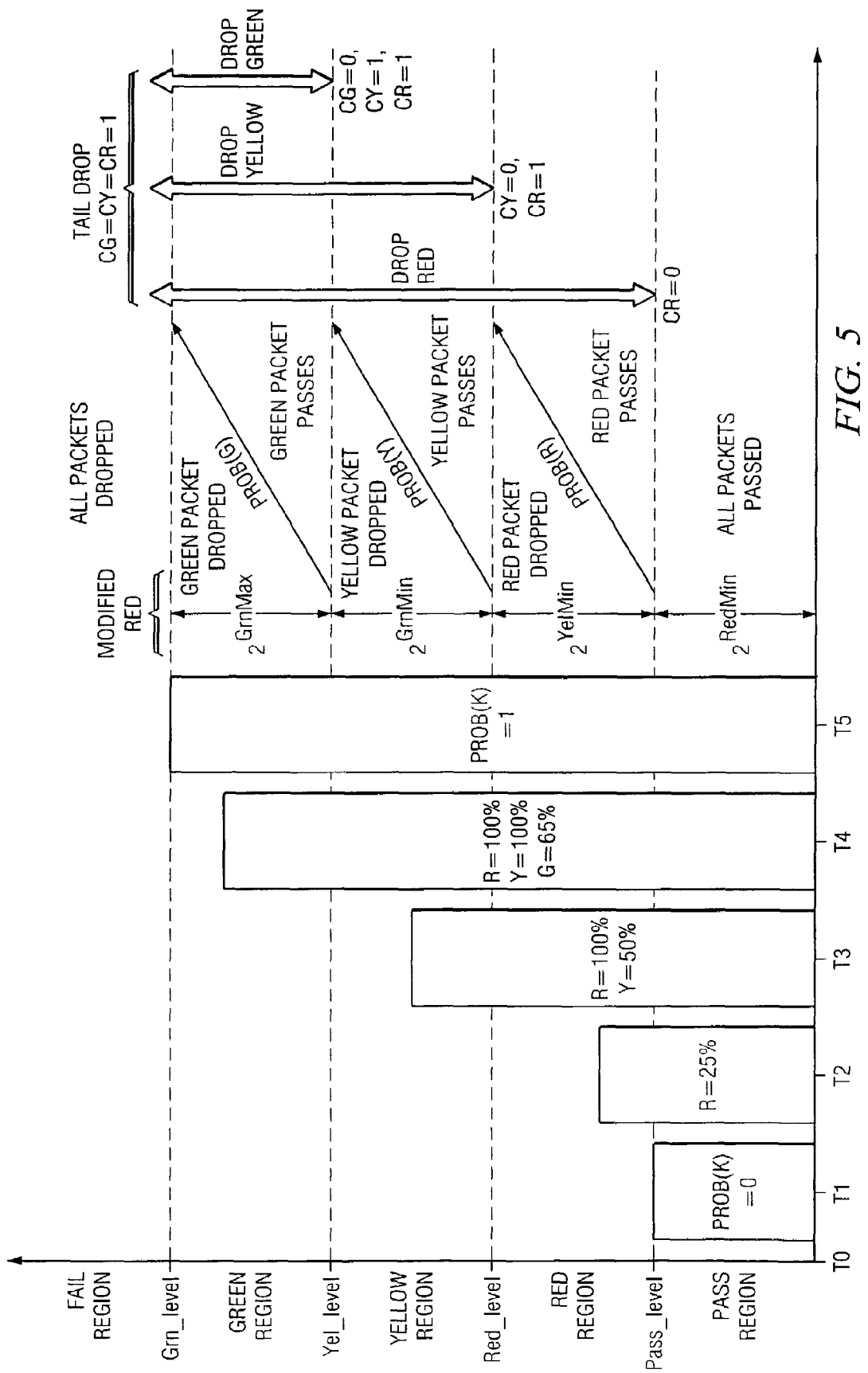
FIG. 5 illustrates an exemplary representation of the congestion management process of FIG. 4.

FIG. 5 provides a numerical example that illustrates the MRED process described in FIG. 4. In FIG. 5, drop regions are defined by four levels represented in the y-axis and time intervals T0-T5 are represented in the x-axis. As shown in FIG. 5, at time TI, the instantaneous queue size (NQ_size) is less than the Pass_level; thus, all received packets are passed. As shown, at T1, the probability that a packet is dropped is zero. As more packets are received than scheduled, the queue size starts to grow. If NQ_size grows past the Pass_level into the red region as shown at time T2, incoming red packets are subject to dropping. The probability of dropping red packets is determined by how far the NQ_size is within the red region. For example, at T2, the NQ_size is 25% into the red region; thus, 25% of red packets are dropped. Similarly, at T3, the NQ_size is 50% into the yellow region; thus, 50% of yellow packets are dropped and 100% of red packets are dropped. At T4, the NQ_size is 65% into the green region; thus, 65% of green packets are dropped and 100% of both red and yellow packets are dropped. At T5, the NQ_size exceeds the green region; thus, all packets are dropped and the probability that a packet is dropped is equal to one.

In another exemplary embodiment, the congestion manager 204 in accordance with the invention applies a weighted tail drop scheme (WTDS). The WTDS also uses congestion regions divided by programmable levels. However, the WTDS does not use probabilities and random numbers to make packet drop decisions. Instead, every packet having the same color is dropped when a congestion level for such color exceeds a predetermined threshold.

Figure 6:
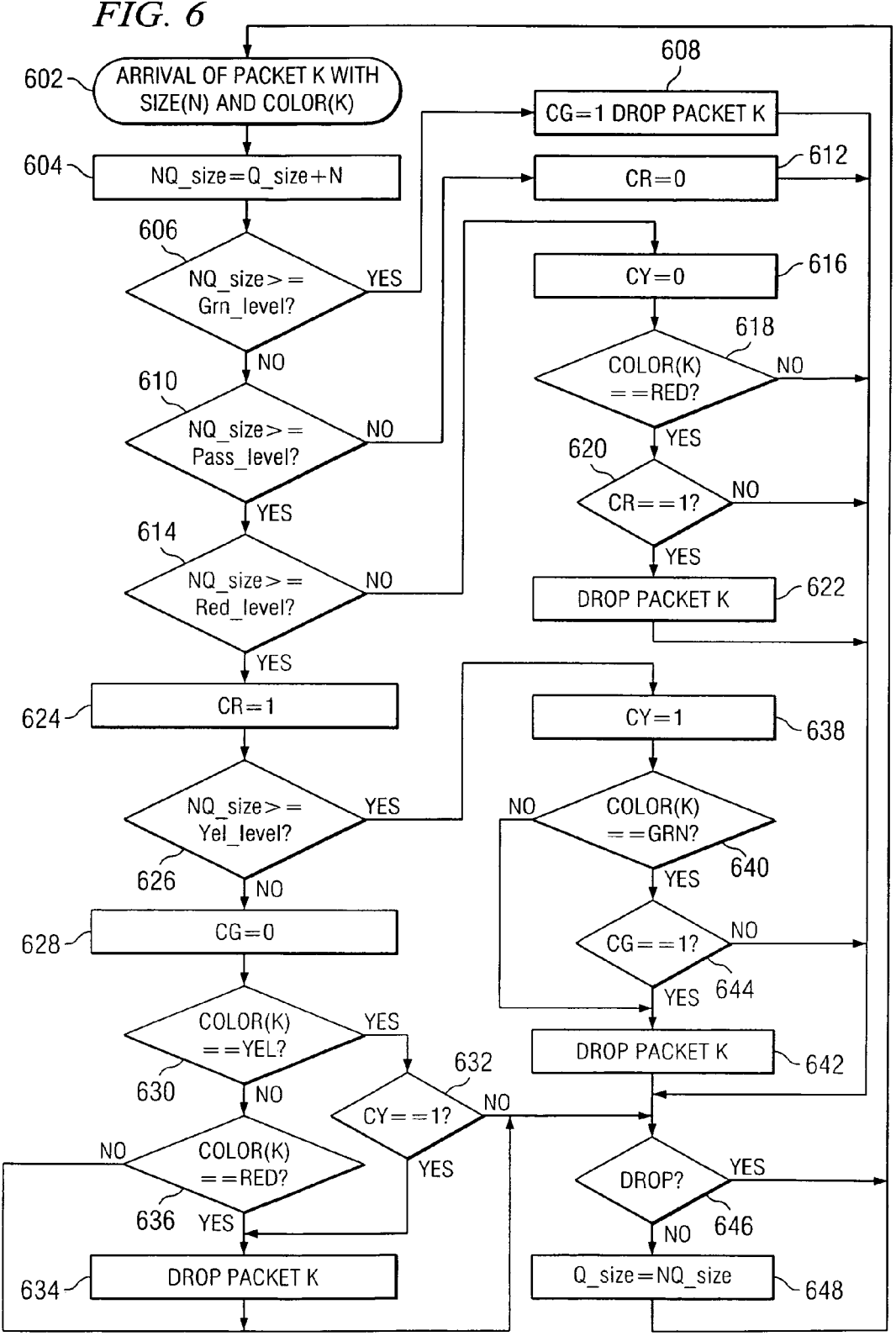
FIG. 6 illustrates another exemplary congestion management process in accordance with an embodiment of the invention.

FIG. 6 illustrates an exemplary WTDS process in accordance with an embodiment of the invention. Assuming three levels of drop preferences: red, yellow, and green, in the order of increasing compliance. In an exemplary embodiment, similar to the MRED process, the WTDS process designates the region above the Grn_level as a fail region where all packets are dropped. A packet k having a packet size N and color(k) is received at step 602. The NQ_size is calculated to equal the sum of Q_size and N (step 604). Next, the NQ_size is compared to the Grn_level (step 606). If the NQ_size is greater than or equal to the Grn_level, the packet is dropped and a green congestion level bit (Cg) is set to one (step 608). When the Cg bit is set to 1, all packets, regardless of color, are dropped. If the NQ_size is less than the Grn_level, the NQ_size is compared to the Pass_level (step 610). If the NQ_size is less than the Pass_level, then a red congestion level bit (Cr) is set to zero (step 612). When the Cr bit is set to zero, all packets, regardless of color, are passed.

Referring back to step 610, if the NQ_size is greater than or equal to the Pass_level, the NQ_size is compared to the Red_level (step 614). If the NQ_size is less than the Red_level, the Cy bit is set to zero (step 616). Next, whether the packet is colored red is determined (step 618). If the packet is red, whether the Cr bit is equal to 1 is determined. If the Cr bit is equal to 1, the red packet is dropped (steps 622 and 646). If the Cr bit is not equal to 1, the red packet is passed (step 646). Referring back to step 618, if the packet is not red, the packet is passed (step 646).

Referring back to step 614, if the NQ_size is greater than or equal to the Red_level, the Cr bit is set to one (step 624). Next, the NQ_size is compared to the Yel_level (step 626). If the NQ_size is less than the Yel_level, the Cg bit is set to equal to zero (step 628). Next, whether the packet is colored yellow is determined (step 630). If the packet is yellow, it is determined whether the Cy bit is equal to 1 (step 632). If Cy is not equal to 1, the yellow packet is passed (step 646). If Cy is equal to 1, the yellow packet is dropped (steps 634 and 646). Referring back to step 630, if the packet is not yellow, whether the packet is red is determined (step 636). If the packet is red, it is dropped (steps 634 and 646). Otherwise, the packet is green by default and is passed (step 646).

Referring back to step 626, if the NQ_size is greater than or equal to the Yel_level, the Cy bit is set to equal to 1 (step 638). Next, whether the packet is green is determined (step 640). If the packet is not green, the packet is dropped (step 642). If the packet is green, whether the Cg bit is equal to one is determined (step 644). If the Cg bit is one, the green packet is dropped (steps 642 and 646). If the Cg bit is not equal to one, the green packet is passed (step 646). At step 646, if the current packet is dropped, the process repeats at step 602 for a new packet. If the current packet is passed, the Q_size is set to equal the NQ_size (step 648) and the process repeats for the next packet.

In an exemplary embodiment, in addition to congestion management per connection, per group, and per port/priority, the congestion manager 204 provides chip-wide congestion management based on the amount of free (unused) memory space on a chip. The free memory space information is typically provided by the packet manager 104 to the packet scheduler 106. In one embodiment, the congestion manager 204 reserves a certain amount of the free memory space for each priority of traffic.

The Scheduler

Figure 7:
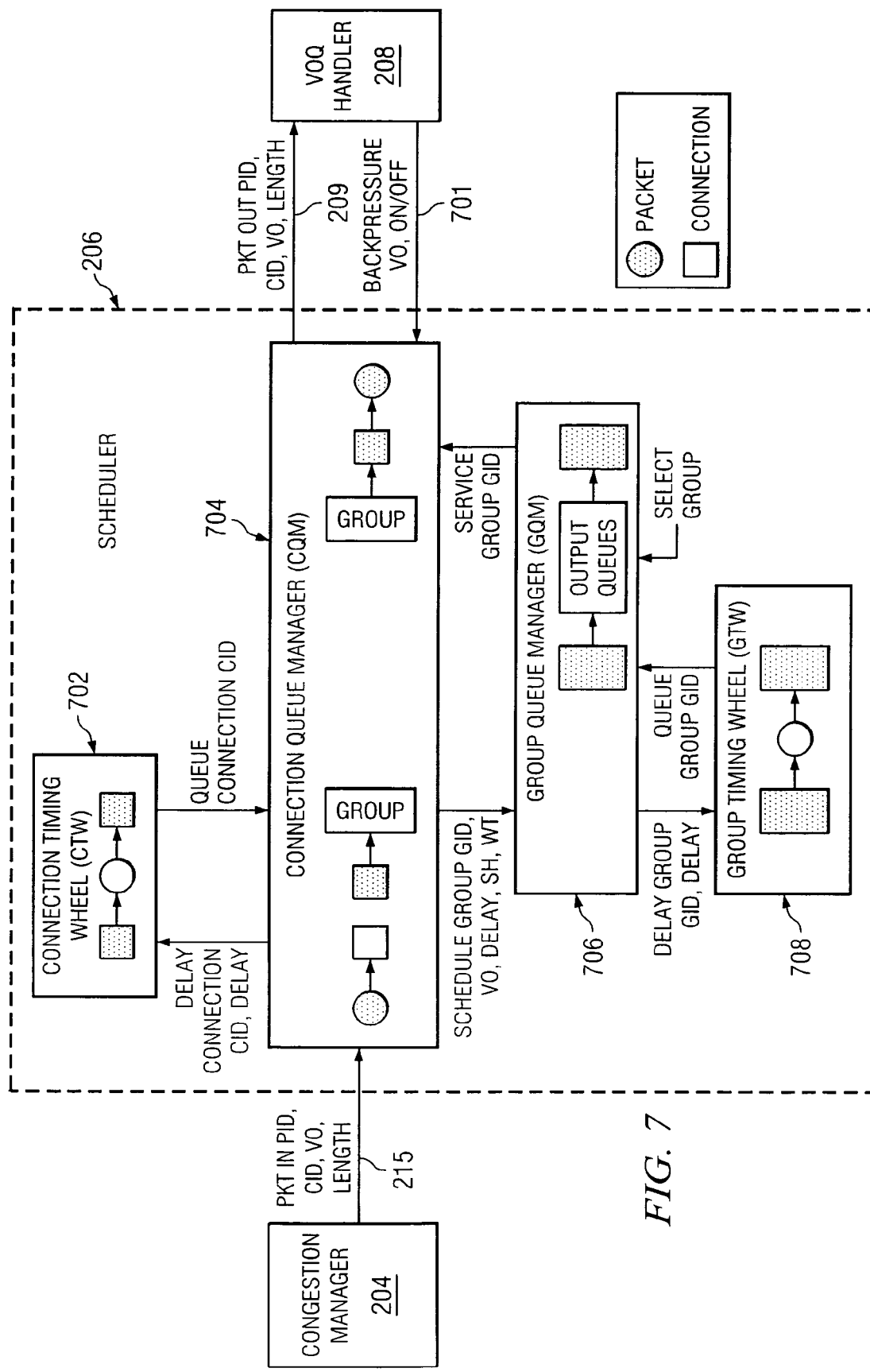
FIG. 7 illustrates an exemplary scheduler in accordance with an embodiment of the invention.

FIG. 7 illustrates an exemplary scheduler 206 in accordance with an embodiment of the invention. The scheduler 206 includes a connection timing wheel (CTW) 702, a connection queue manager (CQM) 704, a group queue manager (GQM) 706, and a group timing wheel (GTW) 708.

Packet information (including a packet descriptor) is received by the scheduler 206 from the congestion manager 204 via the signal line 215. In an exemplary embodiment, packet information includes packet PID, ICID, assigned VO, and packet size. Scheduled packet information is sent from the scheduler 206 to the VOQ handler 208 via the signal line 209 (see FIG. 2).

A connection may be shaped to a specified rate (shaped connection) and/or may be given a weighted share of its group's excess bandwidth (weighted connection). In an exemplary embodiment, a connection may be both shaped and weighted. Each connection belongs to a group.

In an exemplary embodiment, a group contains a FIFO queue for shaped connections (the shaped-connection FIFO queue) and a DRR queue for weighted connections (the weighted-connection DRR queue).

Figure 8A:
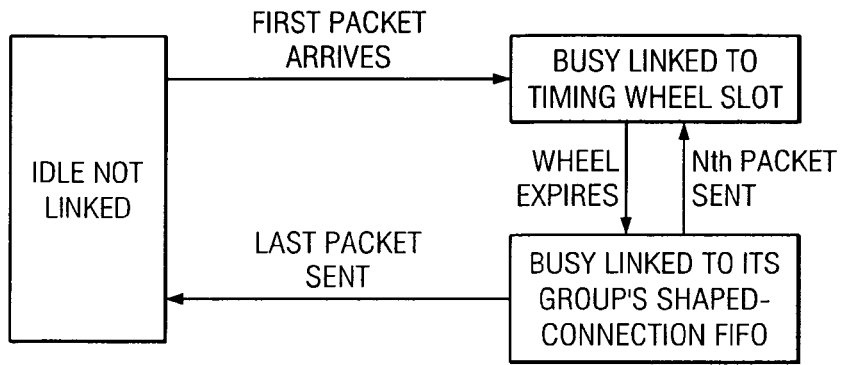
FIGS. 8A-8C illustrate exemplary connection states in accordance with an embodiment of the invention.

In an exemplary embodiment, a PID that arrives at an idle shaped connection is queued on a ICID queue. The ICID queue is delayed on the CTW 702 until the packet's calculated TAT occurs or until the next time slot, whichever occurs later. In an exemplary embodiment, the CTW 702 includes a fine timing wheel and a coarse timing wheel, whereby the ICID queue is first delayed on the coarse timing wheel then delayed on the fine timing wheel depending on the required delay. After the TAT occurs, the shaped connection expires from the CTW 702 and the ICID is queued on the shaped connection's group shaped-connection FIFO. When a shaped connection is serviced (i.e., by sending a PID from that shaped connection), a new TAT is calculated. The new TAT is calculated based on the packet size associated with the sent PID and the connection's configured rate. If the shaped connection has more PIDs to be sent, the shaped connection remains busy; otherwise, the shaped connection becomes idle. The described states of a shaped connection are illustrated in FIG. 8A.

Figure 8B:
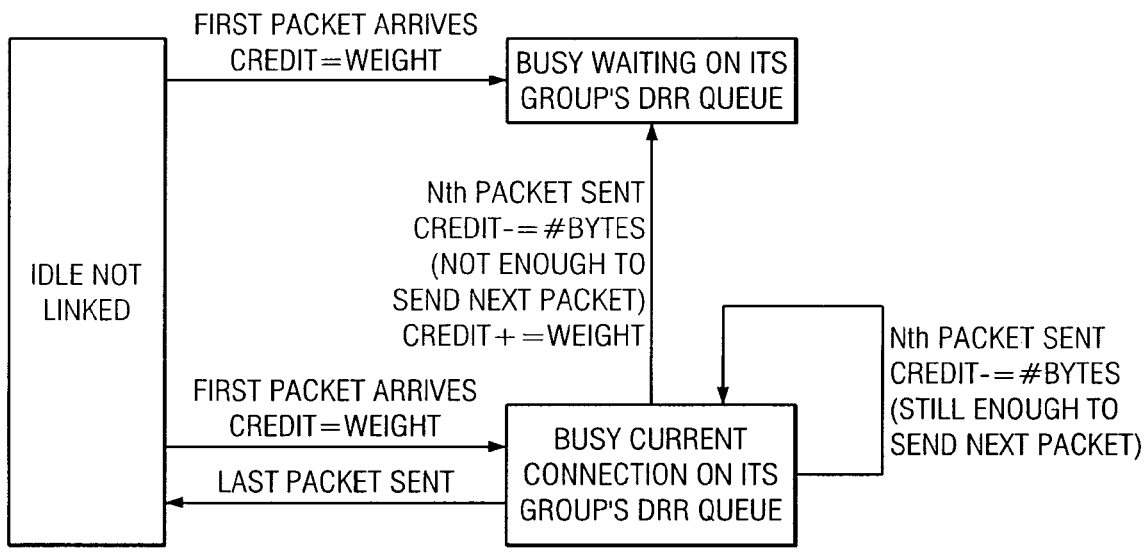

A weighted connection is configured with a weight, which represents the number of bytes the weighted connection is allowed to send in each round. In an exemplary embodiment, an idle weighted connection becomes busy when a PID arrives. When the weighted connection is busy, it is linked to its group's DRR queue; thus, the PID is queued on an ICID queue of the connection's group DRR queue. A weighted connection at the head of the DRR queue can send its PIDs. Such weighted connection remains at the head of the DRR queue until it runs out of PIDs or runs out of credit. If the head weighted connection runs out of credit first, another round of credit is provided but the weighted connection is moved to the end of the DRR queue. The described states of a weighted connection are illustrated in FIG. 8B.

A group is shaped at a configured maximum rate (e.g., 10 G bytes). As described above, each group has a shaped-connection FIFO and a DRR queue. Within a group, the shaped-connection FIFO has service priority over the weighted-connection DRR queue. In addition, each group has an assigned priority. Within groups having the same priority, the groups having shaped connections have service priority over the groups having only weighted connections.

In an exemplary embodiment, the CQM 704 signals the GQM 706 via a signal line 707 to "push," "pop," and/or "expire." The signal to push is sent when a connection is queued on the DRR queue of a previously idle group. The signal to pop is sent when the CQM 704 has sent a packet from a group that has multiple packets to be sent. The signal to expire is sent when a connection expires from the CTW 702 and the connection is the first shaped connection to be queued on a group's shaped-connections FIFO.

In an exemplary embodiment, the GQM 706 may delay a group on the GTW 708, if necessary, until the group's TAT occurs. In an exemplary embodiment, the GTW 702 includes a fine group timing wheel and a coarse group timing wheel, whereby a group is first delayed on the coarse group timing wheel then delayed on the fine group timing wheel depending on the required delay. When a group's TAT occurs, the group expires from the GTW 708 and is queued in an output queue (either a shaped output queue or a weighted output queue). In one embodiment, when a group in an output queue is serviced, a PID from that group is sent out by the CQM 702.

Figure 8C:
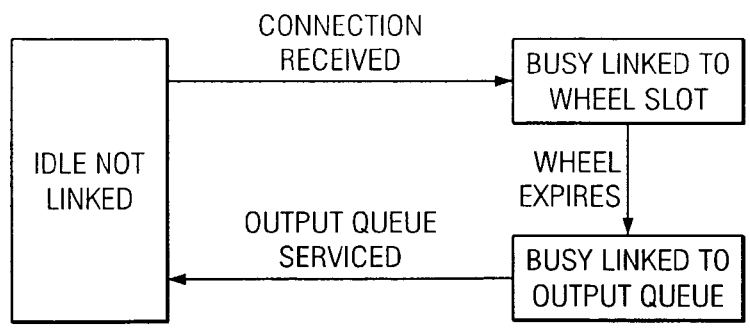

In another embodiment, the CQM 702 may signal a group to "expire" while the group is already on the GTW 708 or in an output queue. This may happen when a group which formerly had only weighted connections is getting a shaped connection off the CTW 702. Thus, if such a group is currently queued on a (lower priority) weighted output queue, it should be requeued to a (higher priority) shaped output queue. The described states of a group are illustrated in FIG. 8C.

In an exemplary embodiment, each group output queue feeds a virtual output queue (VOQ) controlled by the VOQ handler 208. Each VOQ can accept a set of PIDs depending on its capacity. In one embodiment, if a group output queue continues to feed a VOQ after its capacity has been exceeded, the VOQ handler 208 signals the scheduler 206 to back-pressure PIDs from that group output queue via a signal line 701.

In an exemplary embodiment, the use of fine and coarse timing wheels at the connection and group levels allow the implementation of the unspecified bit rate (UBR or UBR+) traffic class. When implementing the UBR+ traffic class, the packet scheduler 106 guarantees a minimum bandwidth for each connection in a group and limits each group to a maximum bandwidth. The fine and coarse connection and group wheels function to promote a below-minimum-bandwidth connection within a group to a higher priority relative to over-minimum-bandwidth connections within the group and promote a group containing below-minimum-bandwidth connections to a higher priority relative to other groups containing all over-minimum-bandwidth connections.

The Virtual Output Queue

Referring back to FIG. 2, a scheduled packet PID, identified by the sch-to-voq signals via signal line 209 to the VOQ handler 208, is queued at one of a set of virtual output queues (VOQs). The VOQ handler 208 uses a feedback signal 213 from the packet manager 104 to select a PID from a VOQ. The VOQ handler 208 then instructs the packet manager 104, by voq-to-pm signals via signal line 211, to transmit a packet associated with the selected PID stored in the VOQ. In an exemplary embodiment, VOQs are allocated in an internal memory.

If a packet to be transmitted has a multicast source, then the VOQ handler 208 uses a leaf table to generate multicast leaf PIDS. In general, multicast leaf PIDs are handled the same way as regular (unicast) PIDS. In an exemplary embodiment, the leaf table is allocated in an external memory.

In an exemplary embodiment, the packet scheduler 106 supports multicast source PIDs in both the ingress and egress directions. A multicast source PID is generated by the packet processor 102 and identified by the packet scheduler 106 via a packet PID's designated output port number. In an exemplary embodiment, any PID destined to pass through a designated output port in the VOQ handler 208 is recognized as a multicast source PID. In an exemplary embodiment, leaf PIDs for each multicast source PID are generated and returned to the input of the packet scheduler 106 via a VOQ FIFO to be processed as regular (unicast) PIDs.

Figure 9:
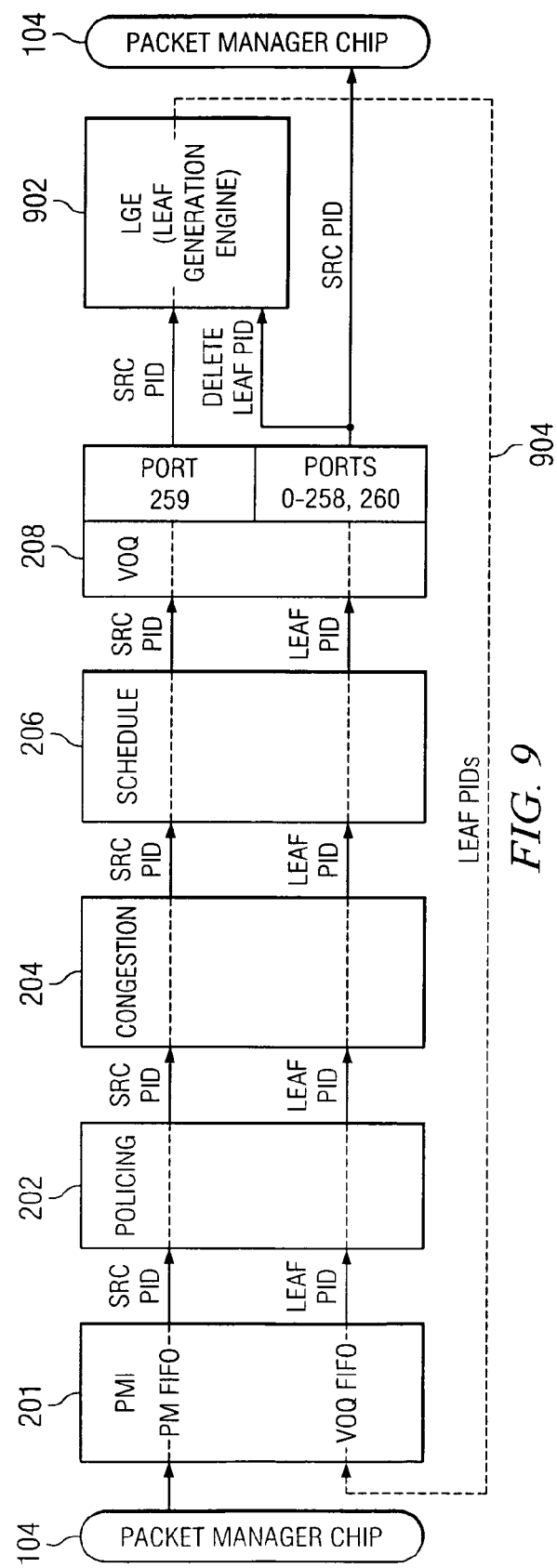
FIG. 9 illustrates an exemplary virtual output queue handler in accordance with an embodiment of the invention.

FIG. 9 illustrates an exemplary packet scheduler 106 that processes multicast flows. The packet scheduler 106 includes all the components as described above in FIG. 2 plus a leaf generation engine (LGE) 902, which is controlled by the VOQ handler 208. Upon receiving a multicast source PID from the VOQ handler 208, the LGE 902 generates leaf PIDs (or leaves) for that multicast source PID. In an exemplary embodiment, the LGE 902 processes one source PID at a time. When the LGE 902 is generating leaf PIDs for a source PID, the VOQ handler 208 interprets the VOQ output port 259 (or the designated multicast port) as being busy; thus, the VOQ handler 208 does not send any more source PIDs to the LGE 902. When the LGE 902 becomes idle, the VOQ handler 208 sends the highest priority source PID available. In one embodiment, after a source PID is sent to the LGE 902, the source PID is unlinked from the VOQ output port 259.

In an exemplary embodiment, the LGE 902 inserts an ICID and an OCID to each leaf. As shown in FIG. 9 via signal line 904, generated leaves are returned to the beginning of the packet scheduler 106 to be processed by the policer 202, the congestion manager 204, the scheduler 206 and the VOQ handler 208 like any regular (unicast) PIDs. Later, the processed leaves (or leaf PIDs) are sent to the packet manager 104 using the original multicast source PID. In an exemplary embodiment, a multicast source PID is referenced by leaf data. Leaf data contains the source PID, OCID, and a use count.

In an exemplary embodiment, the use count is maintained in the first leaf allocated to a multicast source PID. All other leaves for the source PID references the use count in the first leaf via a use count index. In one embodiment, the use count is incremented by one at the beginning of the process and for each leaf allocated. After the last leaf is allocated, the use count is decremented by one to terminate the process. The extra increment/decrement (in the beginning and end of the process) ensures that the use count does not become zero before all leaves are allocated. Using the use count also limits the number of leaves generated for any source PID. In one embodiment, if the use count limit is exceeded, the leaf generation is terminated, a global error count is incremented, and the source CID is stored.

In an exemplary embodiment, leaf PIDs are used to provide traffic engineering (i.e., policing, congestion management, and scheduling) for each leaf independently. In an exemplary embodiment, the VOQ handler 208 identifies a leaf by a leaf PID. After all the leaf PIDs of a source PID have been processed, the VOQ handler 208 sends the source PID information (e.g., source PID, OCID) to the packet manager 104 to instruct the packet manager 104 to send the source PID.

Since leaf PIDs pass through the same traffic engineering blocks (i.e., policer 202, congestion manager 204, and scheduler 206) as regular (unicast) PIDs, some leaf PIDs may be dropped along the way. In one embodiment, each drop signal is intercepted by the VOQ handler 208 from the congestion manager 204. If the signal is to drop a regular PID, the drop signal passes to the packet manager 104 unaltered. If the signal is to drop a leaf PID, the signal is sent to a leaf drop FIFO. The leaf drop FIFO is periodically scanned by the VOQ handler 208. If a signal to drop a leaf PID is received by the VOQ handler 208, the use count associated with that leaf PID is decremented and the leaf is idled. If the use count is equal to zero, then the source PID for that leaf PID is also idled and a signal is sent to the packet manager 104 to not send/delay drop that source PID.

Figure 10:
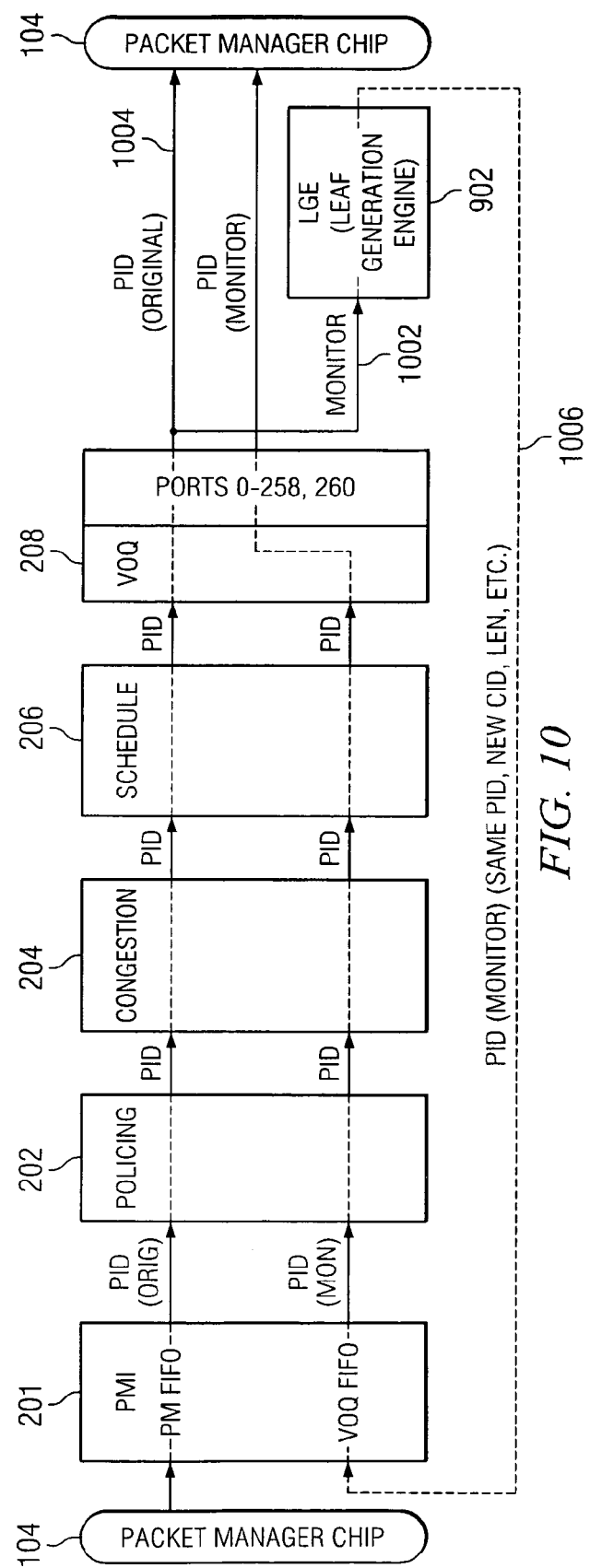
FIG. 10 illustrates another exemplary virtual output queue handler in accordance with an embodiment of the invention.

In another exemplary embodiment, the VOQ handler 208 is configured to process monitor PIDs in the ingress direction. A monitor PID allows an original PID to be sent to both its destination and a designated port. FIG. 10 illustrates an exemplary packet scheduler 106 for processing monitor PIDs in accordance with an embodiment of the invention. The packet scheduler in FIG. 10 includes all the components as described above in FIG. 9. Generally, a monitor flow (including monitor PIDs) is processed similarly to a multicast flow (including multicast source PIDs). A monitor PID is processed by all traffic engineering blocks (i.e., the policer 202, the congestion manager 204, etc.) and is scheduled as any regular (unicast) PID. In an exemplary embodiment, a monitor PID is generated after its associated original PID is sent. An original PID provides monitor code for generating a monitor PID as the original PID is being passed to the packet manager 104 by signal lines 1002 and 1004. In an exemplary embodiment, the monitor code from each original PID is stored in a monitor table. In one embodiment, the VOQ handler 208 accesses the monitor code in the monitor table to generate a monitor PID. The generated monitor PID is passed through the traffic engineering blocks via a signal line 1006.

In an exemplary embodiment, the generated monitor PID includes a monitor bit for identification purposes. In one embodiment, the VOQ FIFO stops receiving multicast leaf PIDs when the VOQ FIFO is half full, thus, reserving half of the FIFO for monitor PIDs. In an exemplary embodiment, if the VOQ FIFO is full, the next monitor PID fails and is not sent. Generally, such next monitor PID is not queued elsewhere. Further, if the VOQ FIFO is full, a monitor PID is sent to the packet manager 104 with instruction to not send/delay drop and a monitor fail count is incremented. In an exemplary embodiment, the LGE 902 arbitrates storage of multicast leaf PIDs and monitor Pills into the VOQ FIFO. In one embodiment, a monitor PID has priority over a multicast leaf. Thus, if a monitor PID is received by the LGE 902, the leaf generation for a multicast source PID is stalled until the next clock period.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A method for managing congestion of packets in a data stream, comprising:
   determining a set of congestion regions by compliance levels, said compliance levels indicating a hierarchy of compliance, compliance being conformance of incoming traffic with a specified data rate;
   receiving a packet in a queue, said packet having an assigned compliance identifier indicating compliance based on an arrival time of the packet, a theoretical arrival time based on the specified data rate, and a packet delay variation tolerance of the packet;
   determining an instantaneous queue size of said queue;
   comparing said instantaneous queue size to said set of congestion regions; and
   passing said packet based on said comparing and said assigned compliance identifier.

2. The method of claim 1, further comprising:
   calculating a percentage in a congestion region;
   generating a random number;
   comparing said percentage to said random number; and
   dropping said packet if said percentage is greater than said random number.

3. The method of claim 1, further comprising:
   passing all packets when said instantaneous queue size is smaller than a lowest compliance congestion region.

4. The method of claim 3, wherein said lowest compliance congestion region is a passing region.

5. The method of claim 1, further comprising:
   dropping all packets when said instantaneous queue size is larger than or equal to a highest compliance congestion region.

6. The method of claim 5, wherein said highest compliance congestion region is a dropping region.

7. The method of claim 1, wherein said compliance levels are determined based on compliance per virtual circuit, per port and per priority for each packet.

8. The method of claim 1, further comprising:
   receiving unused memory space information regarding a chip; and
   managing congestion level of said chip based on said unused memory space information; said managing including allocating a portion of said unused memory space to each traffic priority.

9. A computer readable medium encoded with a computer program for managing congestion of packets in a data stream, the computer program comprising:

logic code for determining a set of congestion regions by compliance levels, said compliance levels indicating a hierarchy of compliance, compliance being conformance of incoming traffic with a specified data rate;

logic code for receiving a packet in a queue, said packet having an assigned compliance identifier indicating compliance based on an arrival time of the packet, a theoretical arrival time based on the specified data rate, and a packet delay variation tolerance of the packet;

logic code for determining an instantaneous queue size of said queue;

logic code for comparing said instantaneous queue size to said set of congestion regions; and logic code for passing said packet based on said comparing and said assigned compliance identifier.

10. The computer readable medium of claim 9, wherein the computer program further comprises:

logic code for calculating a percentage in a congestion region;

logic code for generating a random number;

logic code for comparing said percentage to said random number; and logic code for dropping said packet if said percentage is greater than said random number.

11. The computer readable medium of claim 9, wherein the computer program further comprises:

logic code for passing all packets when said instantaneous queue size is smaller than a lowest compliance congestion region.

12. The computer readable medium of claim 11, wherein said lowest compliance congestion region is a passing region.

13. The computer readable medium of claim 9, wherein the computer program further comprises:

logic code for dropping all packets when said instantaneous queue size is larger than or equal to a highest compliance congestion region.

14. The computer readable medium of claim 13, wherein said highest compliance congestion region is a dropping region.

15. The computer readable medium of claim 9, wherein said compliance levels are determined based on compliance per virtual circuit, per port and per priority for each packet.

16. The computer readable medium of claim 9, wherein the computer program further comprises:

logic code for receiving unused memory space information regarding a chip; and logic code for managing congestion level of said chip based on said unused memory space information; said logic code for managing including logic code for allocating a portion of said unused memory space to each traffic priority.

17. A system for managing congestion of packets in a data stream, comprising:

means for determining a set of congestion regions by compliance levels, said compliance levels indicating a hierarchy of compliance, compliance being conformance of incoming traffic with a specified data rate;

means for receiving a packet in a queue, said packet having an assigned compliance identifier indicating compliance based on an arrival time of the packet, a theoretical arrival time based on the specified data rate, and a packet delay variation tolerance of the packet;

means for determining an instantaneous queue size of said queue;

means for comparing said instantaneous queue size to said set of congestion regions; and means for passing said packet based on said comparing step and said assigned compliance identifier.

18. The system of claim 17, further comprising:

means for calculating a percentage in a congestion region;

means for generating a random number;

means for comparing said percentage to said random number; and means for dropping said packet if said percentage is greater than said random number.

19. The system of claim 17, further comprising:

means for passing all packets when said instantaneous queue size is smaller than a lowest compliance congestion region.

20. The system of claim 17, further comprising:

means for dropping all packets when said instantaneous queue size is larger than or equal to a highest compliance congestion region.

\* \* \* \* \*